United States Patent [19]

Igashira et al.

[11] 4,162,669

[45] Jul. 31, 1979

[54] IGNITION SYSTEM FOR ROTARY PISTON ENGINES

[75] Inventors: Toshihiko Igashira, Toyokawa; Shunzo Yamaguchi, Okazaki; Hisasi Kawai, Toyohashi; Seiji Morino; Naoki Umeda, both of Okazaki, all of Japan

[73] Assignee: Toyota Jidosha Kogyo Kabushiki Kaisha, Toyota, Japan

[21] Appl. No.: 874,483

[22] Filed: Feb. 2, 1978

[30] Foreign Application Priority Data

Feb. 22, 1977 [JP] Japan .................................. 52-18953
Feb. 23, 1977 [JP] Japan .................................. 52-19607

[51] Int. Cl.² .......................... F02B 53/12; F02P 19/02
[52] U.S. Cl. ................................. 123/210; 123/145 A; 123/211; 315/308
[58] Field of Search .................. 123/145 A, 210, 211; 315/308

[56] References Cited

U.S. PATENT DOCUMENTS

| | | | |
|---|---|---|---|
| 1,704,934 | 3/1929 | Briggs | 123/145 A |
| 2,007,508 | 7/1935 | Talmey | 123/145 A |
| 3,196,852 | 7/1965 | Bentele | 123/210 X |

*Primary Examiner*—Carlton R. Croyle
*Assistant Examiner*—Michael Koczo, Jr.
*Attorney, Agent, or Firm*—Cushman, Darby & Cushman

[57] ABSTRACT

An ignition system for rotary piston engine wherein a glow plug mounted in the epitrochoidal housing of the engine is supplied with electric power to maintain the surface temperature of the glow plug within a range from 900° to 1100° C. A control unit for controlling the supply of electric power to the glow plug produces an output pulse signal the pulse width thereof being varied depending on engine operating conditions such as the amount of fuel supply and engine rotational speeds. A power circuit receives the pulse signal from the control unit and on-off controls the supply of electric power to the plug from a battery.

5 Claims, 10 Drawing Figures

IGNITION SYSTEM FOR ROTARY PISTON ENGINES

BACKGROUND OF THE INVENTION

The present invention relates generally to ignition systems for rotary piston engines, and more particularly the invention relates to a control system for controlling the supply of power to the glow plug included in the ignition means of such ignition system.

While the rotary piston engine is basically a spark ignition engine, by virtue of its structure, it is possible to accomplish continuous ignition of the engine by means of a glow plug. In the case of a rotary piston engine whose ignition means consists of a glow plug which is mounted at a position ¼ from the forward end of the combustion chamber which is at the top dead center on the compression stroke, it is possible to ensure considerably improved fuel consumption and reduced exhaust emissions as compared with the ordinary rotary piston engine.

In this case, according to what have been confirmed by the inventors, in order that the mixture may be ignited by the glow plug, the surface temperature of the glow plug must be over 900° C. On the other hand, in consideration of the durability of the glow plug itself, it is desirable to hold the surface temperature of the glow plug below 1100° C. and thus it is important to hold the surface temperature of the glow plug within a range from 900° to 1100° C. However, the required power supply to the glow plug for holding its surface temperature within such a range cannot be constant. In other words, the surface temperature of the glow plug is affected not only by the heat generation of the glow plug itself which is dependent on the supplied power but also by the amount of heat exchanged between the glow plug and the combustion gases in the combustion chamber. As a result, if the amount of power supply is preset so that the surface temperature of the glow plug becomes proper when the amount of heat radiation of the combustion gases is small as during the periods of high speed and low load operation, this poses a problem that such burning losses as a breakage in the heating coil, melting loss of the casing and the like will be caused by the glow plug during the periods of low speed operation or high load operation where the amount of heat radiation of the combustion gases is large.

SUMMARY OF THE INVENTION

With a view to overcoming the foregoing deficiencies, it is an object of the present invention to provide an ignition system for a rotary piston engine wherein the supply of power to a glow plug is controlled in response to the operating conditions of the rotary piston engine, particularly the amount of fuel supply or the engine operating parameters which are closely related to the amount of fuel supplied, such as, the intake vacuum and engine speed, whereby the surface temperature of the glow plug is maintained at a proper temperature so as to prevent the occurrence of burning losses and thereby to ensure positive ignition and improved durability.

Thus, the present invention has among its great advantages the fact that the supply of power to a glow plug is controlled in such a manner that the surface temperature of the glow plug is always maintained at a proper temperature (e.g., 900° to 1100° C.), thus providing the glow plug with a proper mixture igniting ability without deteriorating the durability of the glow plug. This in turn has the effect of ensuring full play to the advantages of the mixture ignition by the glow plug, e.g., reduced exhaust emissions and improved fuel consumption.

DESCRIPTION OF THE PREFERRED EMBODIMENTS

The present invention will now be described in greater detail with reference to the illustrated embodiments.

Figure 1:
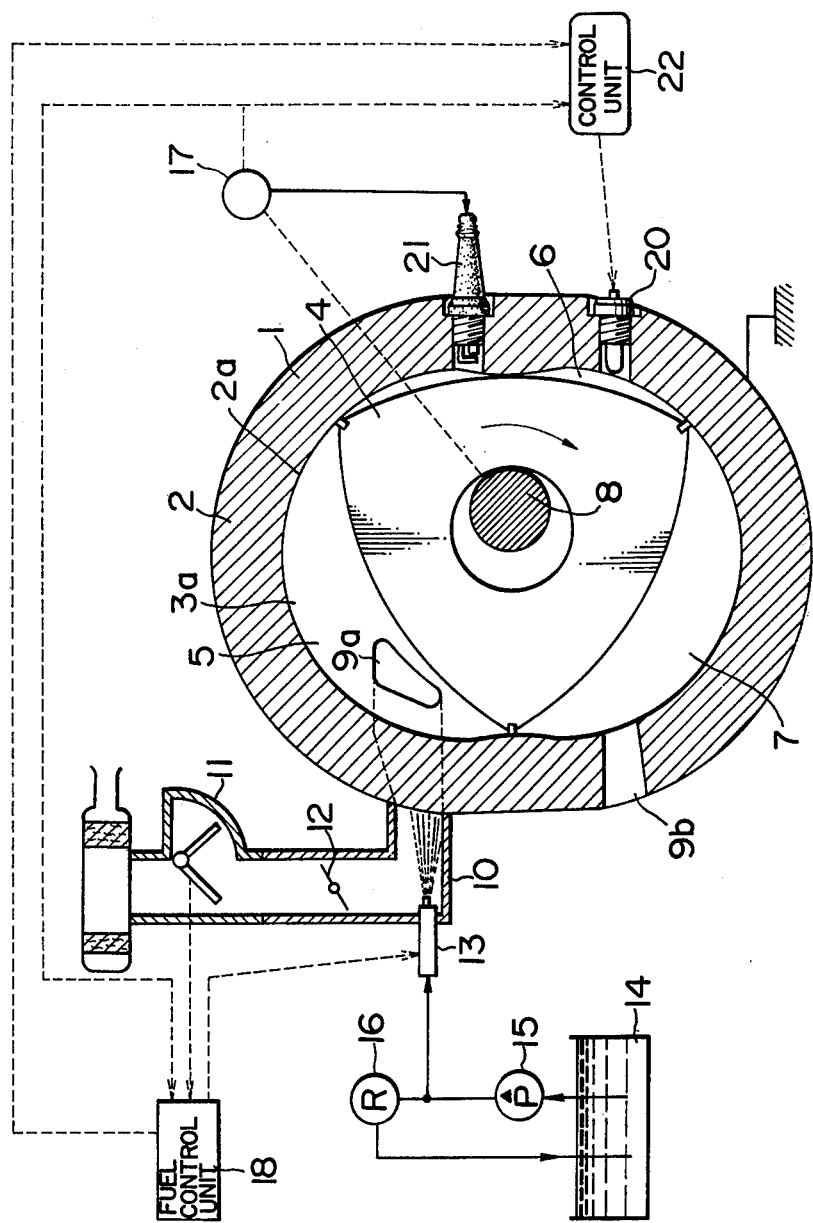
FIG. 1 is a schematic diagram showing a first embodiment of an ignition system according to the present invention.

Referring first to FIG. 1 illustrating a twin-rotor rotary piston engine incorporating the first embodiment of the invention (in the Figure, only one of the rotors is indicated), a housing 1 of the rotary piston engine includes a peripheral wall 2 and a side wall attached to each side of the peripheral wall 2. The peripheral wall 2 includes an inner surface 2a having the profile of an epitrochoidal curve, and each side wall has an inner side surface 3a consisting of a plane surface. Disposed inside the housing 1 is a three-lobe shaped rotor 4 adapted to make a planetary motion in the direction of the arrow, and three working chambers 5, 6 and 7 are defined between the rotor 4 and the housing 1. An output shaft 8 is fitted in the central portion of the rotors 4 so as to deliver to the outside the motion of the rotor 4 as a rotary motion.

The housing 1 is provided at its proper positions with an intake port 9a and an exhaust port 9b which are respectively connected to an intake pipe 10 and an exhaust pipe (not shown). Disposed in the intake pipe 10 are an air flow sensor 11 for detecting the amount of air drawn to generate a corresponding electric signal and a throttle valve 12 adapted to be operated as desired.

Fuel is supplied into the intake pipe 10 by a known type of electronically controlled fuel injection system. This electronically controlled fuel injection system comprises an injector 13 mounted in the intake pipe 10, a fuel pump 15 for supplying fuel under pressure from a fuel tank 14 to the injector 13, a regulator 16 for returning the extra fuel to the fuel tank 14 to maintain the fuel pressure at a predetermined value and a fuel control unit 18 responsive to the signals from the air flow sensor 11 and an engine speed sensor 17 to control the opening and closing of the injector 13. In this embodiment, the amount of fuel supplied (injected) is dependent on the duration of opening (injection) of the injector 13, and this indicates that the injection pulse signal applied to the injector 13 from the fuel control unit 18 represents the amount of fuel supplied. Also the injection pulse signal is synchronized with the rotation of the engine, and three injection pulses are produced for every three revolutions of the output shaft 8 (i.e., one revolution of the rotor 4).

The fuel control unit 18 comprises a known type of electronic circuitry, and the engine speed sensor 17 is of the type which generates an electric signal (e.g., pulse signal) corresponding to the rotational speed of the engine, namely, in this embodiment the speed sensor 17 consists of the interrupter of the ignition distributor.

A glow plug 20 constituting an igniting means is mounted in the peripheral wall 2 so that when the rotor 4 is at the top dead center (the illustrated position), the glow plug 20 is located in the working chamber 6 at a position about ¼ of the chamber from the forward end thereof. A spark plug 21 is mounted in the peripheral wall 2 on the trailing side of the glow plug 20 to provide an auxiliary ignition means, and high voltage is applied from the distributor 17 to the spark plug 21 thus causing the latter to produce spark discharge intermittently.

The glow plug 20 is connected to an ignition control unit 22 so as to receive a controlled power supply. The ignition control unit 22 controls the power supply to the glow plug 20 in response to the engine speed and the amount of fuel supply so as to maintain the glow plug 20 at a temperature sufficient to ignite the mixture but not so high to deteriorate its durability. Thus, the interrupter (not shown) of the distributor 17 constituting the engine speed sensor is connected to the ignition control unit 22 to apply a pulse signal of a frequency corresponding to the engine speed, and the control unit 22 is also connected to the fuel control unit 18 to receive an injection pulse signal corresponding to the amount of fuel supply.

Figure 2:
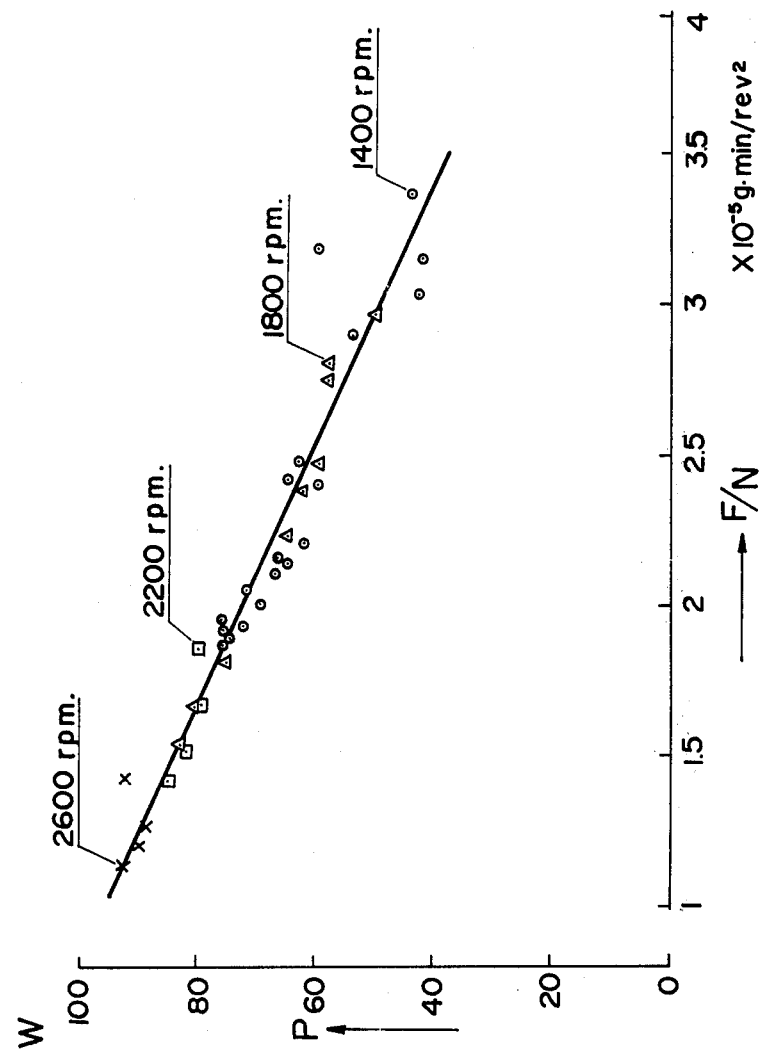
FIG. 2 is a graph showing the relation between the power supply P and the ratio of the amount of fuel supply F to the engine speed N or F/N.

The various experiments conducted by the inventors have shown the existence of the relation shown in FIG. 2 between the required power P (W) for maintaining the surface temperature of the glow plug 20 in the range of 900° to 1100° C. and the engine speed N (rpm) and the fuel supply F per revolution (g/rev), and it has also been confirmed that the power requirement P can be given by the following equation (1)

$$P = 118.34 - 23.04 \times 10^5 \times F/N \tag{1}$$

Consequently, generally the power requirement P can be given by the following equation (2)

$$P = A - B \times F/N$$

(where A and B are the constants).

Thus, the ignition control unit 22 controls the supply of power to the glow plug 20 so as to satisfy the above equation (2) and thereby to always maintain the surface temperature of the glow plug 20 within the range of 900° to 1100° C. It is to be noted that while a satisfactory result may be obtained by controlling the power supply to satisfy the equation (2), it is needless to say that the invention is not limited to this relation and any other approximate relation with some additional correction terms may also be used.

Figure 3:
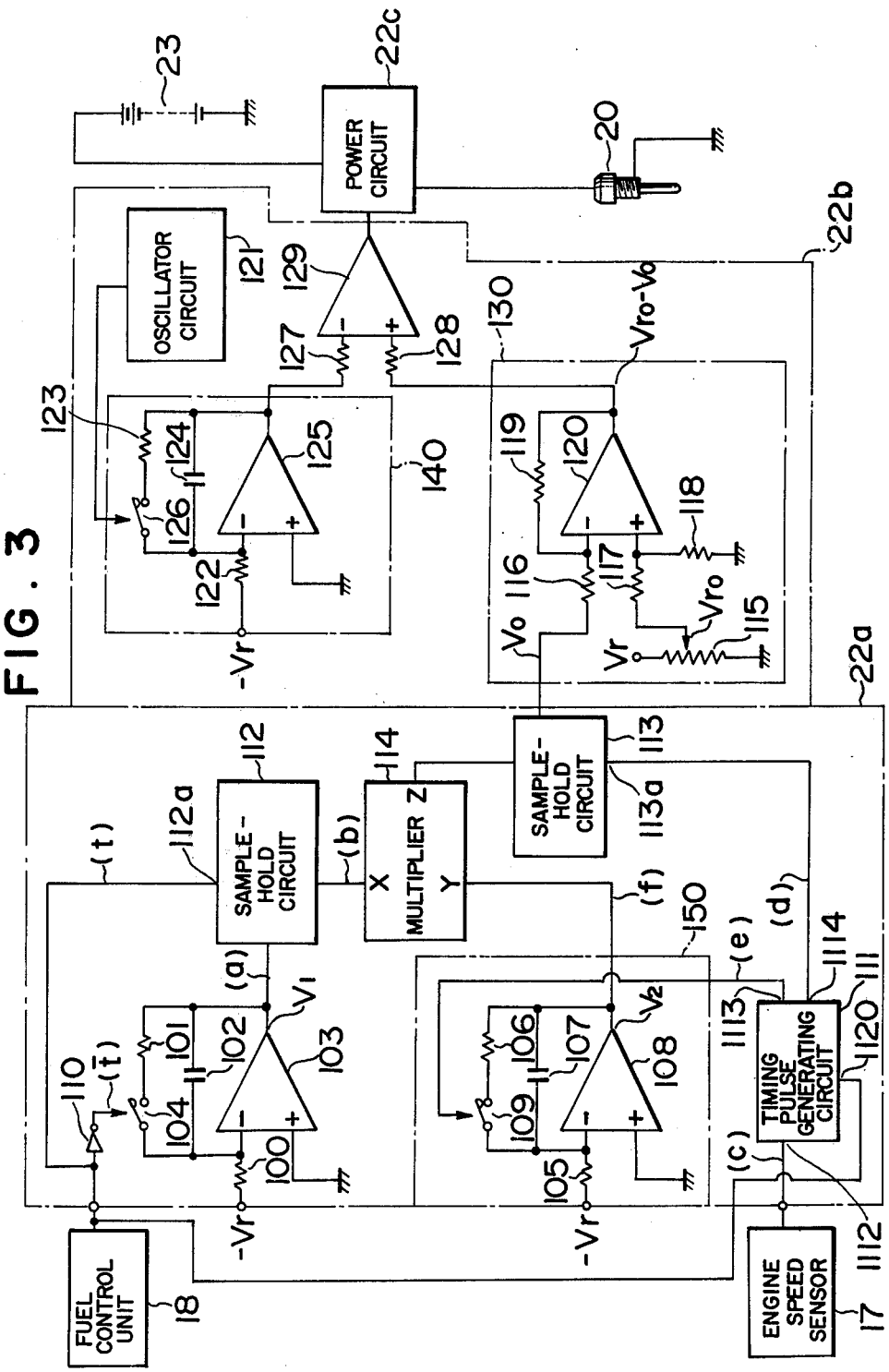
FIG. 3 is a circuit diagram showing in detail the ignition control unit shown in FIG. 1.

Referring now to FIG. 3, there is illustrated a circuit diagram of the ignition control unit 22 used in the first embodiment. In the Figure, a first computing circuit 22a is a circuit for operating on a pulse signal of a frequency corresponding to the engine speed and an injection pulse signal indicative of the quantity of fuel to be supplied, and it comprises a first integrator circuit including resistors 100 and 101, a capacitor 102, an operational amplifier 103 and an analog switch 104, a second integrator circuit 150 including, similarly to the first integrator circuit, resistors 105 and 106, a capacitor 107, an operational amplifier 108 and an analog switch 109, an inverter 110, a timing pulse generating circuit 111, sample-hold circuits 112 and 113 (e.g., Intersil Incorporated 1H5110) and an multiplier 114 (e.g., Intersil Incorporated 8013). The injection pulse signal from the fuel control unit 18 is applied to the inverter 110 and an input terminal 112a of the sample-hold circuit 112, and the speed pulse signal from the engine speed sensor 17 is applied to an input terminal 1112 of the timing pulse generating circuit 111. The injection pulse signal from the fuel control unit 18 is also applied to the other input terminal 1120 of the timing pulse generating circuit 111. A fixed negative voltage $-V_r$ is applied from a constant voltage source (not shown) to the negative input terminal of the operational amplifiers 103 and 108.

A first output terminal 1113 of the timing pulse generating circuit 111 is connected to the analog switch 109 of the second integrator circuit 150 and a second output terminal 1114 is connected to an input terminal 113a (logic input terminal) of the sample-hold circuit 113.

Figure 4:
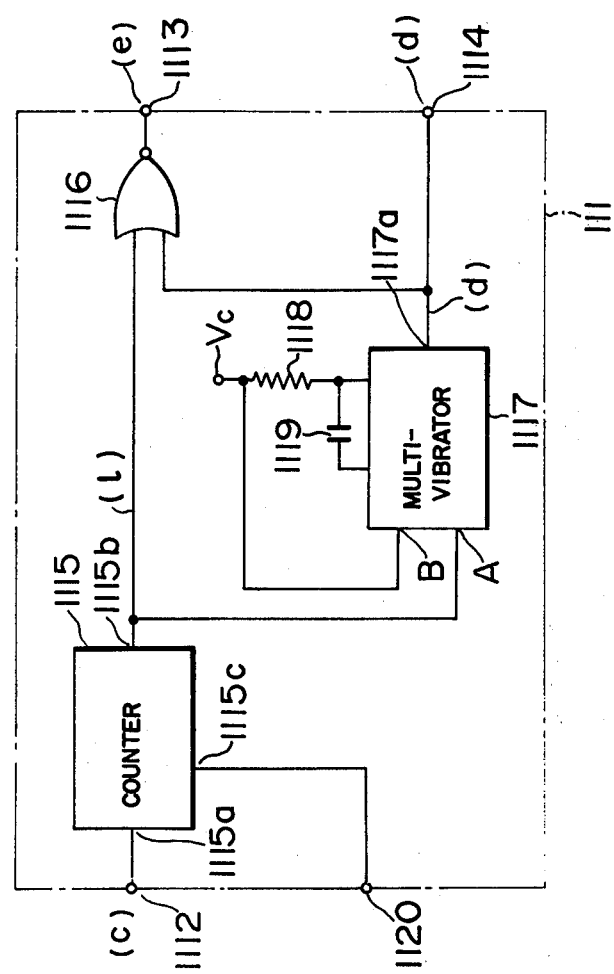
FIG. 4 is a circuit diagram showing the timing pulse generating circuit shown in FIG. 3.

The timing pulse generating circuit 111 will be described in detail with reference to FIG. 4. In the Figure, numeral 1115 designates a counter having its input terminal 1115a connected to the input terminal 1112 of the pulse generating circuit 111 so as to divide the frequency of the engine speed pulse by a factor of 2. The divided pulse is delivered to an output terminal 1115b which is connected to one input terminal of a NOR gate 1116 and an A input terminal of a monostable multivibrator 1117 (the TI 74123). A reset terminal 1115c of the counter 1115 is connected to the other input terminal 1120. A fixed voltage $V_c$ is applied to a B input teminal of the multivibrator 1117, and the pulse duration of the pulse generated at an output terminal 1117a of the multivibrator 1117 is determined by the time constant of a resistor 1118 and a capacitor 1119. This output terminal 1117a is connected to the second output terminal 1114 of the timing pulse generating circuit 111 and also to the other input terminal of the NOR gate 1116. The output terminal of the NOR gate 1116 is connected to the first output terminal 1113 of the timing pulse generating circuit 111. The operation of the timing pulse generating circuit 111 will now be described briefly with reference to the waveform diagram of FIG. 5.

Figure 5:
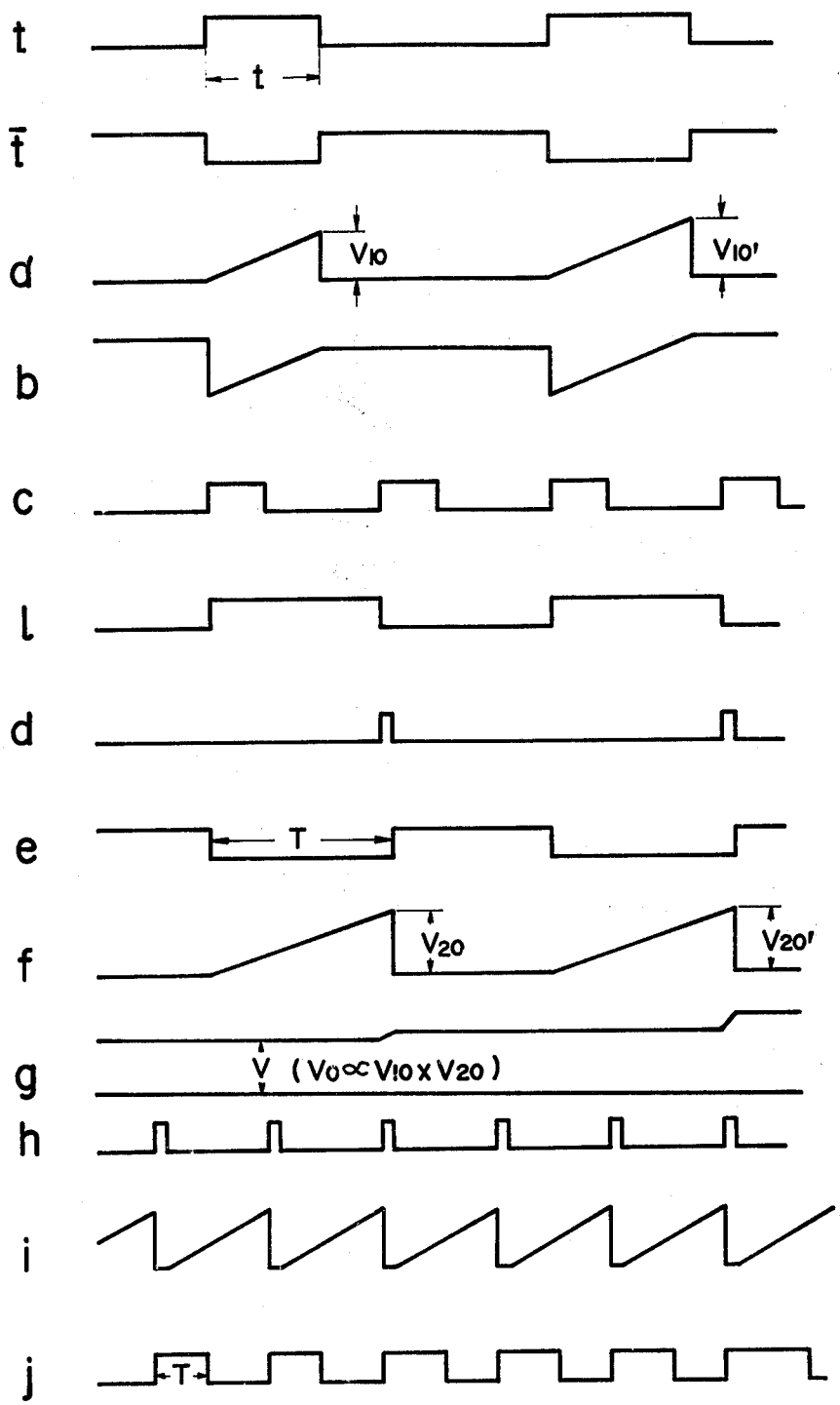
FIG. 5 is a waveform diagram useful for explaining the operation of the first embodiment of the invention.

When the engine speed pulse shown in (c) of FIG. 5 is applied to the input terminal 1112, that is the input terminal 1115a of the conter 1115, the frequency of the speed pulse is divided by 2 and the resulting pulse divided as shown in (l) of FIG. 5 is generated at the output terminal 1115b. In synchronism with the negative-going transition of this pulse, the multivibrator 1117 generates the pulse shown in (d) of FIG. 5. The NOR gate 1116 performs the NOR operation on the pulses shown in (l) and (d) of FIG. 5 and it generates at the first output terminal 1113 the pulse shown in (e) of FIG. 5. On the other hand, the pulse shown in (d) of FIG. 5 is also delivered to the second output terminal 1114 of the timing pulse generating circuit 111.

Referring back to FIG. 3, the operation of the computing circuit 22a will now be described.

When the injection pulse shown in (t) of FIG. 5 and having a time duration t varying in accordance with the amount of fuel supply is applied from the fuel control unit 18, the output of the inverter 110 takes the form of a pulse signal as shown in (t) of FIG. 5. When this pulse signal (t) goes to a "0" level, the analog switch 104 is turned off and the first integrator circuit starts integrating, thus causing the amplifier 103 to generate the sawtooth pulse signal shown in (a) of FIG. 5.

When the pulse signal (t) goes to a "1" level, the analog switch 104 is turned on and the output of the amplifier 103 is reduced to zero volt. If $R_1$ represents the resistance value of the resistor 100 and $C_1$ represents the capacitance of the capacitor 102, then the output voltage $V_1$ of the amplifier 103 is given by $$V_1 = \frac{1}{R_1 C_1} \int_0^t V_r dt$$

On the other hand, the sample-hold circuit 112 hods the signal when its logic input terminal 112a goes to the "0" level and it samples the input signal when the terminal 112a goes to the "1" level. Thus, the output of the sample-hold circuit 112 has the waveform shown in (b) of FIG. 5 with respect to the input waveforms shown in (t) and (a) of FIG. 5. The voltage during the holding period attains the output voltage value $V_{10}$ (or $V_{10'}$) of the amplifier 103 generated in response to the transition of the pulse signal (t) from the "1" level to the "0" level. This voltage value $V_{10}$ (or $V_{10'}$) is one resulting from the integration of the pulse signal having the time duration t and it is proportional to the time duration t or the amount of fuel supply F.

When the pulse signal shown in (c) of FIG. 5 and having a frequency varying accordance with the engine speed is applied from the distributor 17 (the engine speed sensor) to the input terminal 1112 of the timing pulse generating circuit 111, the wave-forms shown in (d) and (e) of FIG. 5 are respectively generated at the first and second output terminals 1113 and 1114 of the timing pulse generating circuit 111. It will thus be seen that the time duration T shown in (e) of FIG. 5 is substantially proportional to the reciprocal 1/N of the engine speed N.

When the pulse signal (e) shown in (e) of FIG. 5 goes to the "0" level, the analog switch 109 is turned off, so that the second integrator circuit starts integrating and the amplifier 108 generates the sawtooth pulse signal shown in (f) of FIG. 5. When the pulse signal (e) goes to the "1" level, the analog switch 109 is turned on and the output of the amplifier 108 goes to the "0" level. If $R_2$ represents the resistance value of the resistor 105 and $C_2$ represents the capacitance of the capacitor 107, then the output voltage $V_2$ of the amplifier 108 is given by $$V_2 = \frac{1}{R_2 C_2} \int_0^T V_r dt$$

In this case, the crest value $V_{20}$ (or $V_{20'}$) of the sawtooth waveform is one resulting from the integration of the pulse signal having the time duration T and it is proportional to 1/N.

The multiplier circuit 114 is preset so that in response to inputs X and Y, an output Z (=XY/10) is generated. The output of the samplehold circuit 112 shown in (b) of FIG. 5 is applied as the input X and the voltage $V_2$ from the amplifier 108 is applied as the input Y. Thus, the output Z of the multiplier 114 is given as follows $$Z = \frac{1}{10} \times \frac{1}{R_1 C_1} \times \frac{1}{R_2 C_2}$$
$$\times \int_0^t V_r dt \times \int_0^T V_r dt$$

The sample-hold circuit 113 is of the same type as the sample-hold circuit 112 and its sampling and holding operations are controlled by the output generated at the second output terminal 1114 of the timing pulse generating circuit 111 as shown in (d) of FIG. 5, so that when the output goes to the "1" level, the input is sampled, and the resulting value is held when the output goes to the "0" level. As a result, the holding voltage $V_O$ has a waveform as shown in (g) of FIG. 5 and it is given by $$V_O = 1/10 \times V_{10} \times V_{20}$$

In this case, since $V_{10}$ is proportional to the amount of fuel supply F and $V_{20}$ is proportional to the reciprocal 1/N of the engine speed N, there is a relation $V_O \propto F/N$. Thus, the computing circuit 22a divides the amount of fuel supply F to the engine by the engine speed N and generates at its output the analog voltage $V_O$ corresponding to $B \times F/N$ in the equation (2).

The second computing circuit 22b is a circuit for computing $A - B \times F/N$ from the analog voltage $V_O$ and generating a pulse signal of a time duration which varies in response thereto, and it comprises a subtractor 130 including a variable resistor 115 for applying a preset voltage, input resistors 116 and 117, a ground resistor 118, a feedback resistor 119 and an operational amplifier 120, a rectangular wave oscillator 121 for generating rectangular pulses at a fixed frequency of 20 Hz (the "1" level time = 1 msec, the "0" level time = 49 msec), an integrator circuit 140 including resistors 122 and 123, a capacitor 124, an operational amplifier 125 and an analog switch 126, and a pulse duration modulator circuit including input resistors 127 and 128 and a comparator 129.

In this second computing circuit 22b, the resistance value of the resistors 116, 117, 118 and 119 of the subtractor 130 is preselected the same, and the amplification factor of the amplifier 120 is unity. Consequently, if $V_O$ represents the output voltage of the first computing circuit 22a and $V_{rO}$ represents the voltage at the variable terminal of the variable resistor 115, then the output of the amplifier 120 is given by $V_{rO} - V_O$.

On the other hand, the rectangular wave oscillator 121 generates clock pulses as shown in (h) of FIG. 5 so as to turn on and off the analog switch 126 in the integrator circuit 140, and the amplifier 125 generates a sawtooth signal as shown by the solid line in (i) of FIG. 5.

The comparator 129 of the pulse duration modulator circuit receives the output voltage $V_{rO} - V_O$ of the subtractor 130 shown by the dotted line in (i) of FIG. 5 and the output of the integrator circuit 140 shown by the solid line in (i) of FIG. 5, so that a "1" level signal is generated when the output voltage of the subtractor 130 is higher than the output voltage of the integrator circuit 140, whereas a "0" level signal is generated in the reverse case. As a result, the output of the comparator 129 consists of the pulse signals as shown in (j) of FIG. 5. The time duration T of this pulse signal is dependent on the output voltage $V_{rO}-V_O$ of the subtractor 130, and the time duration T is proportional to $V_{rO}-V_O$.

A power circuit 22c is a circuit adapted to control the power supply to the glow plug 20 in response to the output signal of the second computing circuit 22b, and it comprises a signal amplifying transistor, resistors, a power transistor, etc. Thus, when the control signal goes to the "1" level, the power circuit 22c is turned on to connect the glow plug 20 with a battery 23, and when the control signal goes to the "0" level, the power circuit 22c is turned off to disconnect the glow plug 20 with the battery 23.

In this way, the glow plug 20 is energized for the time interval T during which the output of the second computing circuit 22b goes to the "1" level.

Now consider the average power consumption of the glow plug 20. Assuming that the internal resistance value of the glow plug 20 is constant irrespective of its temperature, the average power consumption is determined by the time duration of a pulse applied to the control input of the power circuit 22c. This pulse time duration is proportional to $V_{rO}-V_O$ as mentioned previously, and consequently the average power consumption is proportional to $V_{rO}-V_O$. Assuming now that A represents the average power consumption when $V_O=0$ V and $A_O$ represents the average power when $V_{rO}=0$ V, then the average power consumption P of the glow plug 20 becomes $P=A-A_O$. Since the voltage $V_O$ has a relation $V_O \propto F/N$ as mentioned previously, if B represents a proportionality constant, we obtain $P=A-B\times F/N$.

Thus, the power P which is dependent on the amount of fuel supply F and the engine speed N is supplied to the glow plug 20, thereby always maintaining its surface temperature within the range of 900° to 1100° C. This has the effect of allowing the glow plug 20 to always possess a satisfactory ignition ability and also preventing its surface temperature for rising abnormally and thereby ensuring greater durability.

While the proportionality constant B may be preset by adjusting the value of the resistors and capacitors constituting the integrator circuits, the resistors constituting the adjustable resistor and differential amplifier of the multiplier 114, etc., it is of course possible to make the required adjustments by additionally providing adjusting amplifiers. The capacitor of each sample-hold circuit is included in the circuit and not shown in the drawings.

With the construction described above, the air drawn into the intake pipe 10 from the atomsphere forms a mixture with the fuel which is to be injected by the injector 13, and the mixture is drawn into each working chamber through the intake port 9a.

As the rotor 4 rotates, the working chamber is moved and reduced in volume thereby compressing the mixture. When the forward end of the working chamber (one of the apexes of the rotor 4) moves past the glow plug 20, the mixture is successively ignited by the glow plug 20 whose surface temperature is maintained in the range from 900° to 1100° C.

With the rotary piston engine, since the working chambers themselves are rotated along with the rotor 4, a strong air stream is produced within the combustion chamber and this air stream flows from the forward end toward the rear end of the combustion chamber thus preventing the propagation of the flame toward the rear portion of the chamber. As a result, a slow combustion occurs in which only the mixture flowing past the glow plug 20 is continuously burned, thus reducing $NO_x$ emissions. Moreover, the continuous ignition eliminates the danger of the flame being interrupted and also ensures burning of the whole mixture, increased stability, reduced HC emissions and improved fuel consumption.

In this case, since a slow burning of the mixture has the effect of decreasing the maximum power output, if necessary, the ignition by the spark plug 21 may be effected so as to increase the power output.

While, in the above-described embodiment, the surface temperature of the glow plug is controlled in the range from 900° to 1100° C., it is of course possible to modify the range more or less depending on the type of plug and engine.

Further, while, in the above-described embodiment, the amount of fuel supply F (g/rev) is detected by means of the injection pulse to the injector, it is possible to utilize the output signal of a device which is generally known as a fuel consumption meter, such as, a volumetric flow meter positioned in the fuel line.

Still further, while the engine speed N (rpm) is detected by means of the intermittent signal from the interrupter of the trailing plug distributor, the engine speed may be detected by any other method using a combination of projections formed on the engine output shaft and a magnet pickup, for example.

While the first embodiment of the invention has been described as applied to an engine equipped with an electronically controlled fuel injection system, the invention is not intended to be limited to such application, and the invention may be applied to any engine having the ordinary carburetor. In this case, since the amount of fuel supply to the engine cannot be easily represented by an electric signal as accurately as in the case of the first embodiment, the similar control as in the case of the first embodiment is effected by utilizing an engine operating parameter (in this case, the intake pipe vacuum) which is closely related to the amount of fuel supply.

Figure 6:
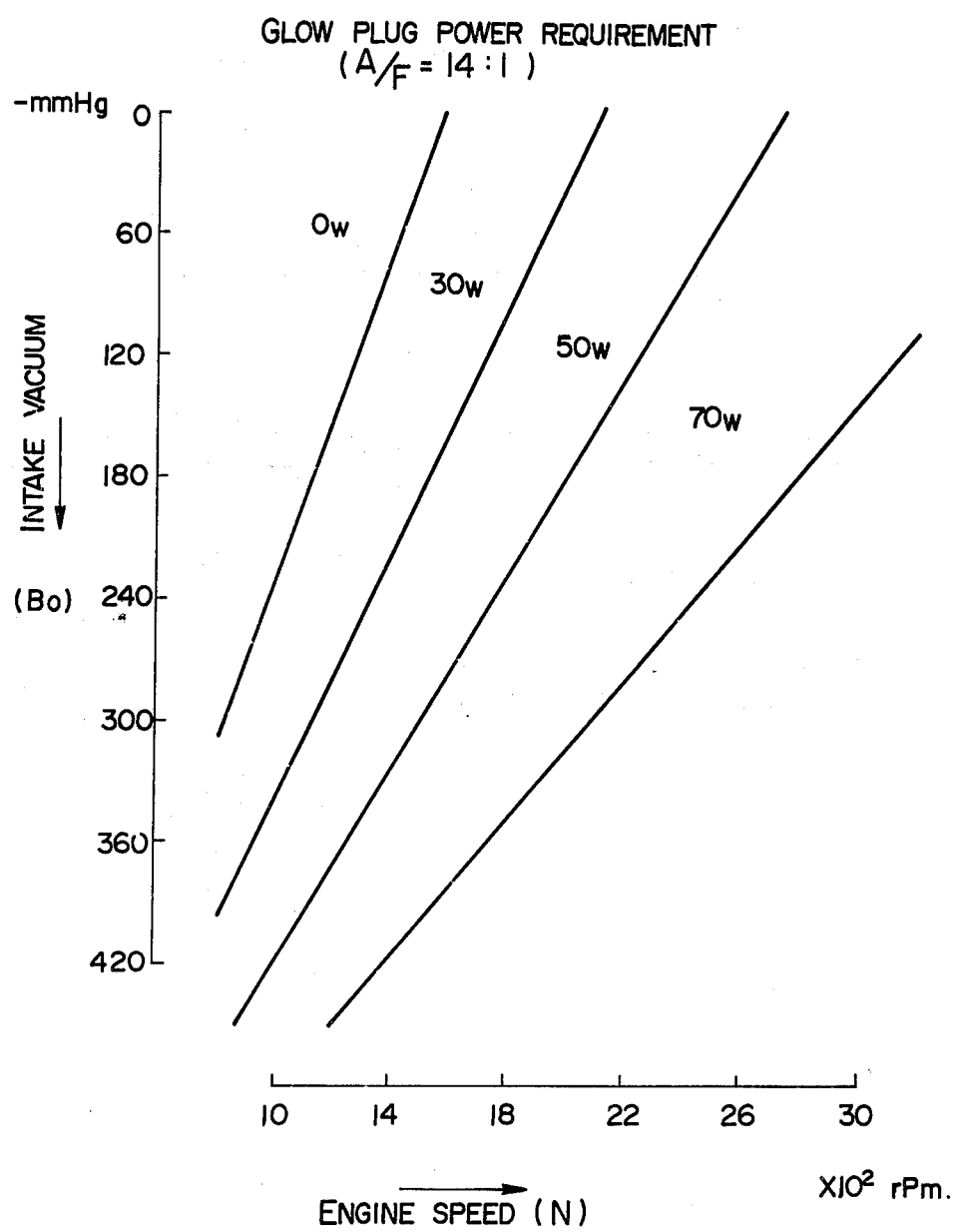
FIGS. 6 and 7 are graphs showing the power supply P to the glow plug in relation to the intake pipe vacuum BO and the engine speed N.

The inventor conducted experiments in this respect to obtain the power requirement (the required power for maintaining the glow plug temperature within the range 900° to 1100° C.) in relation to the engine speed N (rpm) and the intake pipe vacuum, and the results obtained with the air-fuel ratio of 14:1 are shown in FIG. 6. The power requirement P was given by the following equation (3)

$$P = 118.34 - \frac{3986}{N} \left( \frac{650}{14} - \frac{B_0}{14} \right) \tag{3}$$

Figure 7:
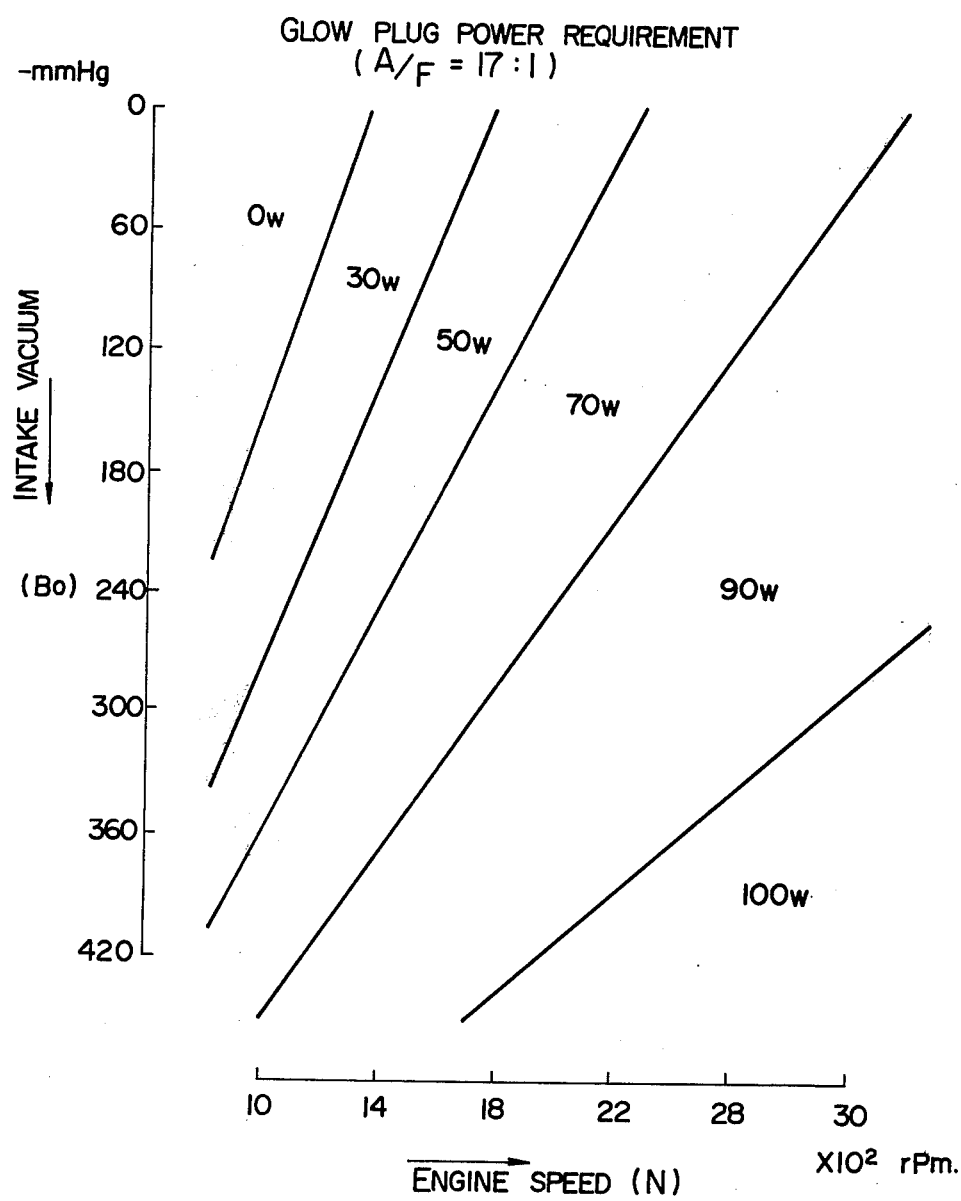

As regards the power requirements with the air-fuel ratio of 17:1, the results shown in FIG. 7 were obtained and in this case the power requirement P was given by the following equation (4)

$$P = 118.34 - \frac{3986}{N} \left( \frac{650}{17} - \frac{B_0}{17} \right) \tag{4}$$

Consequently, generally the power requirement P was given by the following equation (5)

$$P = \alpha - \frac{\beta'}{N}\left(\frac{\gamma}{A/F} + \frac{B_0}{A/F}\right) \tag{5}$$

Here, $\alpha$, $\beta'$ and $\gamma$ are constants, and A/F is the air-fuel ratio of mixture. With an engine, even if the rotational speed N and the intake pipe vacuum $B_O$ are changed, the air-fuel ratio A/F will be rarely changed greatly. Thus, if variation of the air-fuel ratio is neglected and is considered constant, the above equation (5) may be considered to be equivalent to the following equation (6)

$$P = \alpha - \beta/N(\alpha - B_O) \tag{6}$$

Here, $\alpha$, $\beta$ and $\gamma$ are all constants. In other words, it has been found that by controlling the supply of power so as to satisfy the above equation (6), it is possible to always maintain the temperature of the glow plug within the range from 900° to 1100° C.

As a result, with a second embodiment of the invention, more preferably the power supply to the glow plug is controlled so as to satisfy the equation (6) and thereby to always maintain the glow plug at a temperature which is capable of igniting the mixture but does not deteriorate the durability of the glow plug.

Figure 8:
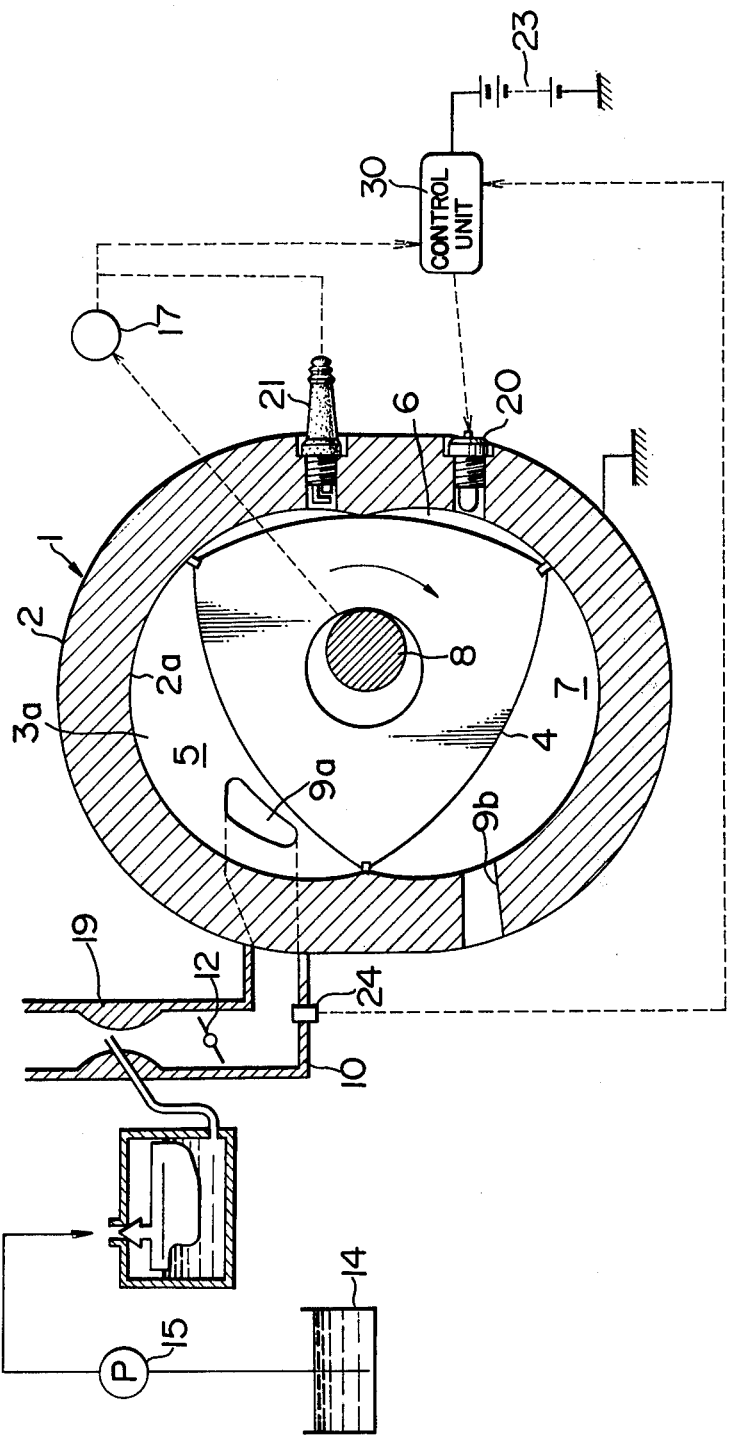
FIG. 8 is a schematic diagram showing a second embodiment of the invention.

Referring now to FIG. 8, there is illustrated a rotary piston engine incorporating the second embodiment of the invention. This engine is substantially the same with that incorporating the first embodiment and therefore only the differences between FIGS. 1 and 8 will be described. In the Figure, a carburetor 19 of a known type is provided upstream of a throttle valve 12 so as to supply mixture to the engine. A pressure sensor 24 is mounted in an intake pipe 10, and a control unit 30 controls the supply of power to a glow plug 20 in response to the signals from the pressure sensor 24 and an engine speed sensor 17.

Figure 9:
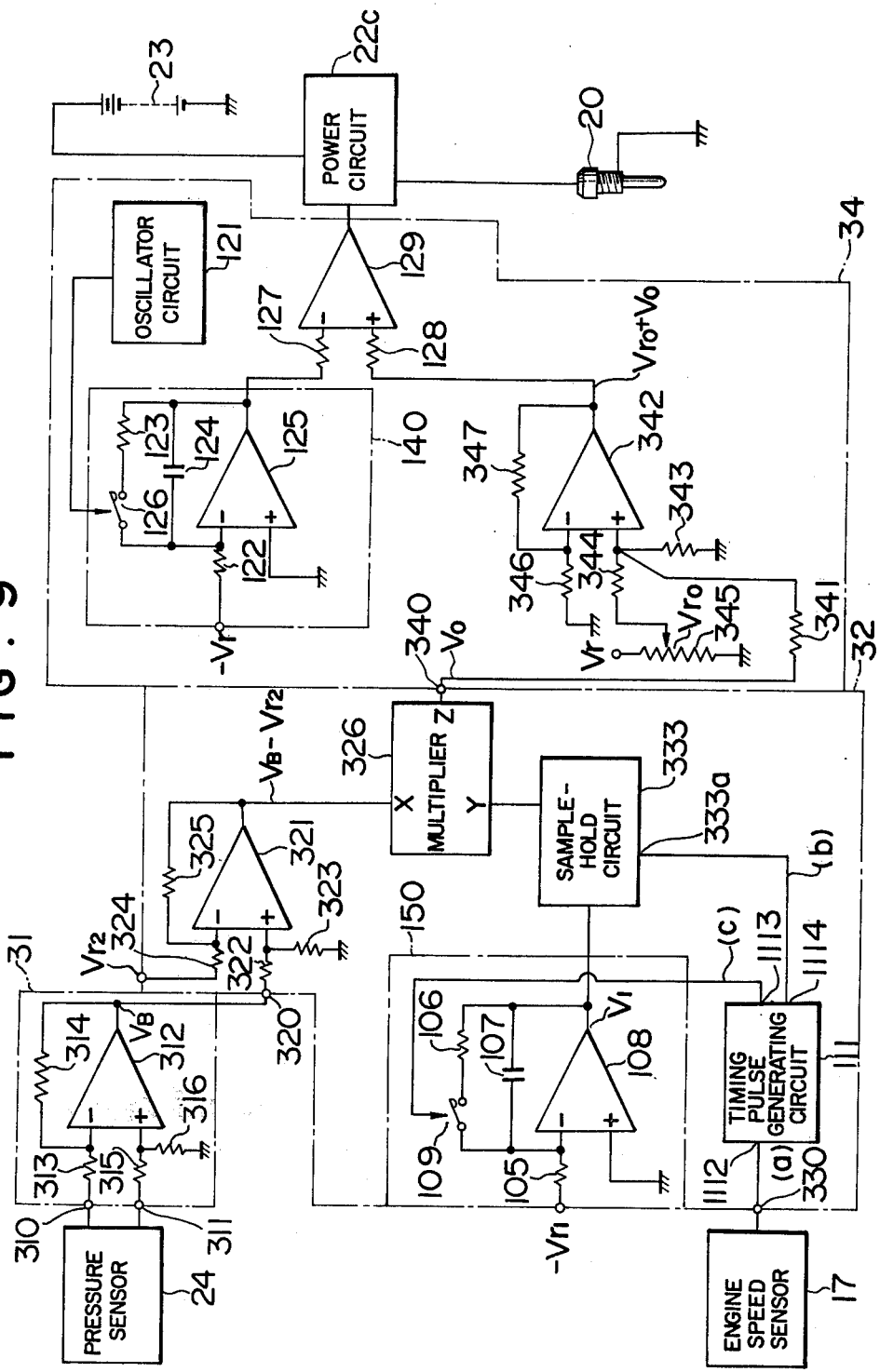
FIG. 9 is a circuit diagram showing in detail the ignition control unit shown in FIG. 8.

FIG. 9 illustrates a circuit diagram of the control unit 30. In the Figure, a differential amplifier 31 is connected through its two input terminals 310 and 311 to the semiconductor pressure sensor 24, and an amplifier 312 has its negative terminal connected to the first input terminal 310 through a resistor 313 and to its output through a resistor 314. The amplifier 312 also has its positive terminal connected to the second input terminal through a resistor 315 and also to the ground through a resistor 316. The semiconductor pressure sensor 24 comprises a bridge and its two junction points are respectively connected to the first and second input terminals 310 and 311 of the differential amplifier 31. Consequently, the differential amplifier 31 generates an output corresponding to the intake pipe vacuum of the engine so that when the absolute value of the intake pipe vacuum increases (when the absolute pressure decreases), the output of the differential amplifier 31 increases. This output voltage is represented by $V_B$.

A computing circuit 32 is connected through its first input terminal 320 to the output of the differential amplifier 31, and the positive terminal of an amplifier 321 is connected to the first input terminal 320 through a resistor 322. The positive terminal of the amplifier 321 is also grounded through a resistor 323. On the other hand, the negative input terminal of the amplifier 321 is connected through a resistor 324 to a power circuit which is not shown and a fixed voltage $V_{r2}$ is applied thereto. The negative input terminal of the amplifier 321 is also connected to its output through a feedback resistor 325.

The output of the amplifier 321 is connected to an X input of a multiplier 326.

A second input terminal 330 of the computing circuit 32 is connected to the distributor interrupter constituting the engine speed sensor 17 to receive intermittent signals, and the second input terminal 330 is connected to the input terminal 1112 of the timing pulse generating circuit 111 described in connection with FIG. 4. In this embodiment, however, no terminal is provided which corresponds to the other input terminal 1120, and the reset terminal 1115c of the counter 1115 in FIG. 4 is grounded. The first output terminal 1113 of the timing pulse generating circuit 111 is connected to the logic input of the analog switch 109 of the integrator circuit 150 which is the same as described in connection with FIG. 3, and the second output terminal 1114 of the timing pulse generating circuit 111 is connected to a logic input terminal 333a of a sample-hold circuit 333. The amplifier 108 has its positive input terminal grounded and its negative input terminal connected through the resistor 105 to a power circuit which is not shown, and a constant voltage $-V_{r1}$ is applied to the negative input terminal. The output of the amplifier 108 is connected to another input of the sample-hold circuit 333. The sample-hold circuit 333 comprises the Intersil Incorporated 1H5110 including a charging and discharging capacitor therein, and its output is connected to an Y input of the multiplier 326. The multiplier 326 comprises the Intersil Incorporated 8013, and its output constituting the output of the computing circuit 32 is connected to an input terminal 340 of a drive circuit 34.

In this computing circuit 32, a circuit comprising the amplifier 321 and the resistors 322, 323, 324 and 335 is a known type of differential amplifier circuit in which a fixed reference voltage $V_{r2}$ is applied to its negative input and the output voltage $V_B$ of the differential amplifier 31 is applied to its positive input. Consequently, the output of the amplifier 321 is proportional to $V_B - V_{r2}$.

On the other hand, the intermittent signal from the distributor 17 which is synchronized with the rotation of the engine output shaft 8 is applied to the second input terminal 330 from which the signal is applied to the input terminal 1112 of the timing pulse generating circuit 111. As a result, the output waveforms at the output terminals 1113 and 1114 become as shown in (b) and (c) of FIG. 10 with respect to the intermittent signal shown in (a) of FIG. 10. In this case, the time duration T of the waveform (c) is proportional to the reciprocal 1/N of the engine rotational speed N as in the case of the first embodiment.

Figure 10:
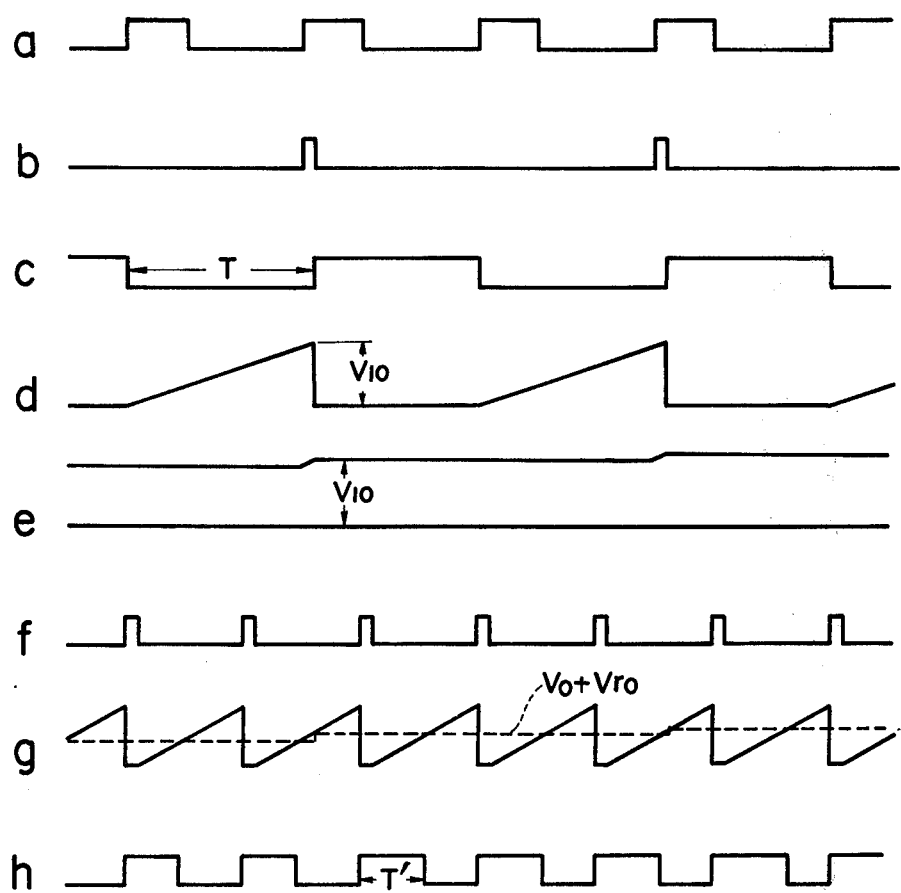
FIG. 10 is a waveform diagram useful for explaining the operation of the second embodiment of the invention.

The integrator circuit 150 of the same construction as that used in the first embodiment, receives the output generated at the output terminal 1113 of the timing pulse generating circuit 111 and generates the output waveform shown in (d) of FIG. 10. In this case, if $R_1$ represents the resistance value of the resistor 105, $C_1$ represents the capacitance of the capacitor 107 and $-V_{r1}$ represents the voltage applied to one end of resistor 105 as in the case of the first embodiment, then the resulting output voltage $V_1$ is given by $$V_1 = \frac{1}{R_1 C_1} \int_0^T V_{r1}\, dt$$

The voltage value $V_{10}$ attained during the time interval T is proportional to 1/N.

On the other hand, the sample-hold circuit 333 samples the input when the input at its logic input 333a goes to "1" and it holds the resulting value when the logic output goes to "0", thus generating an output waveform as shown by the waveform (e) of FIG. 10. The voltage during the holding period reaches the voltage value $V_{10}$ attained at the end of the time interval T, and this voltage value $V_{10}$ is proportional to the time interval T. The multiplier 326 receives at its X input $V_B-V_{r2}$ from the amplifier 321 and at its input the voltage $V_{10}$ from the sample-hold circuit 333, thus generating at its output $Z=1/10$ XY or a voltage proportional to $(V_B-V_{r2})\times V_{10}$. As a result, the output is proportional to $(V_B-V_{r2})\times 1/N$.

In the drive circuit 34, its input terminal 340 is connected through a resistor 341 to the positive input of an amplifier 342. The positive input of the amplifier 342 is also connected to the ground through a resistor 343 and to the variable terminal of a variable resistor 345 through a resistor 344. A constant voltage $V_r$ is applied to one end of the variable resistor 345 whose other end is grounded. The negative input of the amplifier 342 is connected to the ground through a resistor 346 and is also connected to its output through a feedback resistor 347.

The rectangular wave oscillator 121 is the same with that used in the first embodiment, and it is turned on and off at such a fixed frequency as 20 Hz, thus generating rectangular pulses whose ON time is 49 ms and OFF time is 1 ms. The pulses from the pulse oscillator 121 are applied to the logic input of the analog switch 126 of the integrator circuit 140 of the same construction as the integrator circuit 140 in the first embodiment.

The outputs of the amplifiers 342 and 125 are respectively connected through resistors 127 and 128 to the positive and negative input terminals of a comparator 129 whose output is in turn connected to the control input of a power circuit 22c. Although not shown, the power circuit 22c is a known circuit comprising an NPN transistor, resistors, power transistor, etc., so that a connection is established between its input and output when the control input goes to "1" and the connection is interrupted when the control input goes to "0". The output of the power circuit 22c is connected to the glow plug 20. A battery 23 is connected to the power circuit 22c. Here, it is selected so that if $R_1$, $R_2$, $R_3$, $R_4$ and $R_5$ respectively represent the resistance values of the resistors 341, 343, 344, 346 and 347 connected to the amplifier 342, then $R_1=R_2=R_3=R_4$ and $R_5=2R_1$.

With this drive circuit 34, if the voltage at the input terminal 340 is represented by $V_O$ proportional to $(V_B-V_{r2})/N$ as mentioned previously and the voltage at the variable terminal of the variable resistor 345 is represented by $V_{rO}$, then the output of the amplifier 342 is given by $V_{rO}+V_O$.

On the other hand, the analog switch 126 is opened and closed at the oscillation frequency of the rectangular wave oscillator 121, and consequently a saw-tooth waveform is generated at the output of the amplifier 125. In FIG. 10, (f) shows the output waveform of the rectangular wave oscillator 121 and (g) shows the output waveform of the amplifier 125 constituting the integrator circuit. Consequently, the waveform shown in (h) of FIG. 10 is generated at the output of the comparator 129. If T' represents the "1" duration time of the waveform shown in (h), then the duration time T' is proportional to $V_{rO}+V_O$. When the output of the comparator 129 goes to "1", the current is switched on in the power circuit 22c to energize the glow plug 20, and the current is switched off when the comparator output goes to "0".

Now considering the average power to the glow plug 20, if the internal resistance value of the glow plug 20 is constant irrespective of its temperature, the average power supply is determined by the pulse applied to the control input of the power circuit 22c (the pulse shown in (h) of FIG. 10). The pulse duration is proportional to $V_{rO}+V_O$ as mentioned previously, and the average power supply to the glow plug 20 is proportional to $V_{rO}+V_O$. Thus, if A represents the value of the average power supply which is determined by $V_{rO}$ alone when $V_O=0$ V and $A_O$ represents the value of the average power supply which is determined by $V_O$ alone when $V_{rO}=0$ V, then the overall average power supply P to the glow plug 20 is given by $P=A+A_O$. Since the value $A_O$ (or $V_O$) is proportional to $1/N$ $(V_B-V_{r2})$ and $V_B$ is proportional to the intake pipe vacuum $B_O$ as mentioned previously, we obtain $P=A+(\beta/N)(B_O-V_{r2})$. Here, is a constant.

In this case, while the value A is determined by $V_{rO}$ or the setting of the variable resistor 345 and is adjustable, it is a constant which is independent of the engine operating conditions. Also $V_{r2}$ is a constant which is independent of the engine operating conditions. Thus, the above-mentioned power supply equation agrees with the equation (6) experimentally obtained by the inventor.

In other words, the above-described control unit 30 supplies power to the glow plug 20 as shown in FIGS. 6 and 7 in relation to variations in the engine intake vacuum and rotational speed. As a result, the temperature of the glow plug 20 can always be maintained within the range from 900° to 1100° C. irrespective of variations in the engine intake vacuum and rotational speed, thus always providing the glow plug 20 with the required ignition ability and also preventing its temperature from rising abnormally and thereby ensuring improved durability.

While, in the control unit 30, the required proportionality constants are obtained by means of the constants of the integrator circuits, multiplier and amplifiers, it is possible to obtain them by varying the gains by means of adjusting amplifiers.

While, in the above-described embodiments, the power supply to the glow plug 20 is determined with the air-fuel ratio being constant, in practice there are cases where the air-fuel ratio of mixture is held richer than usual, such as, during no-load operation or full-load operation. Consequently, in accordance with this invention, it is possible to accomplish power control for the glow plug with greater accuracy by providing compensation for changes in the air-fuel ratio of mixture. In this case, it is only necessary to compensate the constant $\beta$ in the equation (6), and consequently it is possible to provide compensation for changes in the air-fuel ratio by for example constructing the control unit so that when the intake pipe vacuum $B_O$ becomes smaller than a preset value (at fuel load operation) or greater than another preset value (at no-load operation), this is detected to change the constant $\beta$ to another value different from that used at the normal operation. For example, in the case of a rotary piston engine with a fuel supply system designed to operate the engine with an air-fuel ratio of 15:1 when the intake pipe vacuum is over 120 mmHg and to operate the engine with an air-fuel ratio of 13.5:1 when the intake pipe vacuum is below 120 mmHg (at high load operation), it is only necessary to arrange so that only when the intake pipe vacuum drops below 120 mmHg, the value of $\beta$ in the equation (6) is changed to 13.5/15 of the value previously used normally.

Further, while the technique of measuring the air-fuel ratio of mixture by an oxygen content sensor comprising zirconia or the like has been developed recently, in the case of a rotary piston engine having such sensor, the power supply to the glow plug 20 can be simply controlled in accordance with the equation (5) which additionally takes the air-fuel ratio of mixture into consideration.

We claim:

1. An ignition system for a rotary piston engine comprising:
   - a glow plug mounted in an epitrochoidal housing of an engine on the leading side of the trochoidal minor axis of said housing in the direction of rotation of a rotor;
   - engine speed detecting means for detecting the rotational speed of said engine;
   - parameter detecting means for detecting the amount of fuel supply to said engine or an engine operating parameter related to said amount of fuel supply; and
   - an ignition control circuit connected to said engine speed detecting means and said parameter detecting means and responsive to the signals therefrom to control the supply of power to said glow plug thereby to maintain the temperature of said glow plug within a predetermined temperature range.

2. An ignition system according to claim 1, wherein said ignition control circuit supplies to said glow plug an amount of electric power determined by the following equation or power substantially equivalent to said amount:

$$P = A - B \times (F/N)$$

where
   P = power supply (W),
   A and B = constants,
   N = engine rotational speed (rpm), and
   F = amount of fuel supply (g/rev).

3. An ignition system according to claim 1, wherein said parameter detecting means comprises a vacuum detector for detecting the vacuum in the intake pipe of said engine.

4. An ignition system according to claim 3, wherein said ignition control circuit supplies to said glow plug an amount of power determined by the following equation or power substantially equivalent to said amount:

$$P = \alpha - (\beta/N)(\gamma - B_O)$$

where
   P = power supply (W),
   $\alpha$, $\beta$ and $\gamma$ = constants,
   N = engine rotational speed (rpm), and
   $B_O$ = intake pipe vacuum (mmHg).

5. An ignition system according to claim 1, wherein said predetermined temperature range is from 900° to 1110° C.

* * * * *